(12) United States Patent
Spargo

(10) Patent No.: US 11,536,289 B1
(45) Date of Patent: Dec. 27, 2022

(54) WATER PUMPING AND DISTRIBUTION SYSTEMS AND LOUIE PUMP ASSEMBLIES

(71) Applicant: Rick Spargo, Hoxie, AR (US)

(72) Inventor: Rick Spargo, Hoxie, AR (US)

( * ) Notice: Subject to any disclaimer, the term of this patent is extended or adjusted under 35 U.S.C. 154(b) by 0 days.

(21) Appl. No.: 17/843,281

(22) Filed: Jun. 17, 2022

(51) Int. Cl.
| F04D 29/52 | (2006.01) |
| F04D 15/00 | (2006.01) |
| F04D 9/04 | (2006.01) |
| E03B 5/04 | (2006.01) |
| F04D 13/02 | (2006.01) |
| A01G 25/00 | (2006.01) |

(52) U.S. Cl.
CPC .............. *F04D 29/528* (2013.01); *E03B 5/04* (2013.01); *F04D 9/04* (2013.01); *F04D 13/02* (2013.01); *F04D 15/0011* (2013.01); *A01G 25/00* (2013.01)

(58) Field of Classification Search
CPC ........ F04D 9/04; F04D 13/02; F04D 15/0011; F04D 29/528; E03B 5/04; A01G 25/00
See application file for complete search history.

(56) References Cited

U.S. PATENT DOCUMENTS

| 2,744,465 | A | | 5/1956 | Springer |
| 3,270,677 | A | | 9/1966 | Eller et al. |
| 5,509,437 | A | * | 4/1996 | Merrett .................. A62C 35/68 |
| | | | | 137/513.5 |
| 6,401,829 | B1 | * | 6/2002 | Newton .................. A62C 27/00 |
| | | | | 239/724 |
| 6,474,962 | B1 | | 11/2002 | Allen et al. |
| 6,988,874 | B2 | | 1/2006 | Spargo |
| 8,007,249 | B2 | | 8/2011 | Spargo |
| 8,631,815 | B2 | * | 1/2014 | VanConett .............. F04B 23/02 |
| | | | | 137/236.1 |
| 8,734,092 | B1 | | 5/2014 | Spargo |
| 9,512,583 | B1 | | 12/2016 | Spargo |
| 2011/0209346 | A1 | | 9/2011 | Kobayashi |

FOREIGN PATENT DOCUMENTS

CN 211621781 U * 10/2020

* cited by examiner

*Primary Examiner* — Audrey B. Walter
(74) *Attorney, Agent, or Firm* — R. Keith Harrison

(57) ABSTRACT

A pumping unit operable to pump water has a longitudinal pumping unit axis. A pump shaft engages shaft bearings in a pump shaft housing. A drain conduit includes a drain conduit inlet segment, a drain conduit ascending segment, and a drain conduit terminal segment. The drain conduit inlet segment has a longitudinal drain conduit axis disposed at an obtuse angle to the longitudinal pumping unit axis. The drain conduit ascending segment is disposed at an obtuse angle to the drain conduit inlet segment. The drain conduit terminal segment is disposed at an obtuse angle with respect to the drain conduit ascending segment and is disposed at a level above the shaft bearing. Accordingly, backflow water flowing through the drain conduit terminal segment, the drain conduit ascending segment and the drain conduit inlet segment, respectively, flows into the pump shaft housing to contact and cool the shaft bearing.

20 Claims, 14 Drawing Sheets

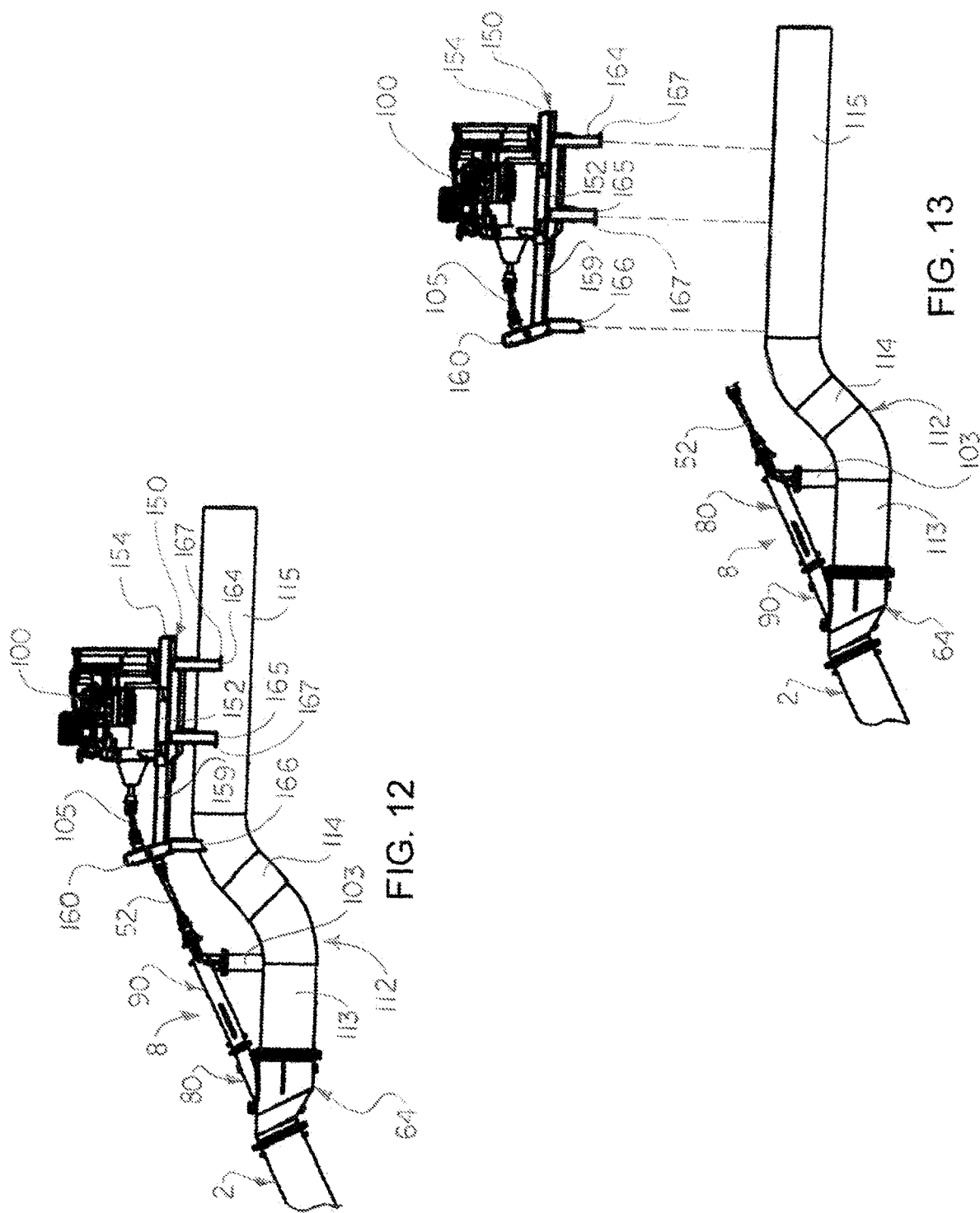

WATER PUMPING AND DISTRIBUTION SYSTEMS AND LOUIE PUMP ASSEMBLIES

FIELD

Illustrative embodiments of the disclosure relate to water pumps. More particularly, illustrative embodiments of the disclosure relate to water pumping and distribution systems suitable for pumping floodwater to a plain for irrigation and/or other purposes, and to Louie pump assemblies therefor.

SUMMARY

Illustrative embodiments of the disclosure are generally directed to Louie pump assemblies suitable for a water pumping and distribution system. An illustrative embodiment of the Louie pump assemblies may include a pumping unit operable to pump water. The pumping unit may have a longitudinal pumping unit axis. A pump drive unit may include a pump shaft housing. At least one shaft bearing may be provided in the pump shaft housing. A pump shaft may engage the shaft bearings in the pump shaft housing. The pump shaft may drivingly engage the pumping unit. A power unit may drivingly engage the pump shaft for rotation. A drain conduit may include a drain conduit inlet segment disposed in fluid communication with the pumping unit and the pump shaft housing of the pump drive unit. The drain conduit inlet segment may have a longitudinal drain conduit axis disposed at an obtuse drain conduit inlet angle to the longitudinal pumping unit axis of the pumping unit. A drain conduit ascending segment may be disposed in fluid communication with and ascending from the drain conduit inlet segment. The drain conduit ascending segment may be disposed at an obtuse ascending segment angle to the drain conduit inlet segment. A drain conduit terminal segment may be disposed in fluid communication with the drain conduit ascending segment. The drain conduit terminal segment may be disposed at an obtuse terminal segment angle with respect to the drain conduit ascending segment. The drain conduit terminal segment may be disposed at a valve segment level above the shaft bearing. Accordingly, backflow water flowing through the drain conduit terminal segment, the drain conduit ascending segment and the drain conduit inlet segment, respectively, may flow into the pump shaft housing and contact the shaft bearing to cool the shaft bearing.

Illustrative embodiments of the disclosure are further generally directed to water pumping and distribution systems. An illustrative embodiment of the water pumping and distribution systems may include a ditch. A slope may extend upwardly from the ditch, elevated ground may extend adjacent to and away from the slope. A plain may spread adjacent to and away from the elevated ground. At least one irrigation field may be provided on the plain. A Louie pump assembly may include a pumping unit disposed along the slope in fluid communication with the ditch and operable to pump water from the ditch. The pumping unit may have a longitudinal pumping unit axis. A pump drive unit may operably engage the pumping unit. The pump drive unit may include a pump shaft housing. At least one shaft bearing may be provided in the pump shaft housing. A pump shaft may engage the shaft bearing in the pump shaft housing. The pump shaft may drivingly engage the pumping unit. A power unit may drivingly engage the pump shaft for rotation. A drain conduit may extend along the elevated ground. The drain conduit may include a drain conduit inlet segment disposed in fluid communication with the pumping unit and the pump shaft housing of the pump drive unit. The drain conduit inlet segment may have a longitudinal drain conduit axis disposed at an obtuse drain conduit inlet angle to the longitudinal pumping unit axis of the pumping unit. A drain conduit ascending segment may be disposed in fluid communication with and ascend from the drain conduit inlet segment. The drain conduit ascending segment may be disposed at an obtuse ascending segment angle to the drain conduit inlet segment. A drain conduit terminal segment may be disposed in fluid communication with the drain conduit ascending segment and extending along the elevated ground. The drain conduit terminal segment may be disposed at an obtuse terminal segment angle with respect to the drain conduit ascending segment. The drain conduit terminal segment may be disposed at a valve segment level above the shaft bearing. Accordingly, backflow water flowing through the drain conduit terminal segment, the drain conduit ascending segment and the drain conduit inlet segment, respectively, may flow into the pump shaft housing and cool the shaft bearing. At least one primary discharge conduit may be disposed in fluid communication with the drain conduit terminal segment and extend along the plain. At least one secondary discharge conduit may be disposed in fluid communication with the primary discharge conduit. The secondary discharge conduit or conduits may discharge at the irrigation field or fields.

BRIEF DESCRIPTION OF THE DRAWINGS

Illustrative embodiments of the disclosure will now be described, by way of example, with reference to the accompanying drawings, in which:

FIG. 12 is a side view of the illustrative pump assembly, partially in section, particularly illustrating a typical configuration for the drain conduit of the assembly and with the power unit stand in place on the drain conduit and a power unit on the power unit stand and drivingly engaging the impeller shaft of the pump assembly;

FIG. 13 is a sectioned side view of the illustrative pump assembly with the power unit stand and the power unit thereon removed from the drain conduit;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower". "left" "rear", "right". "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
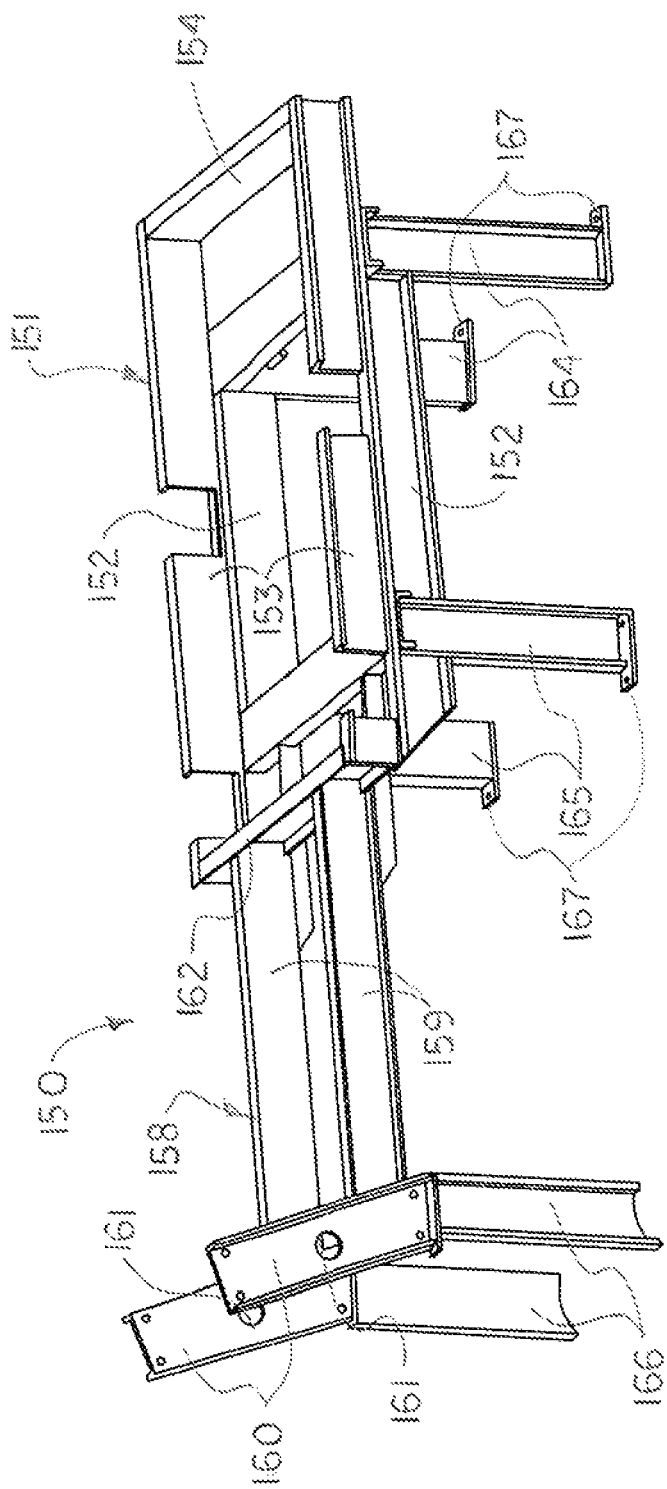
FIG. 9 is a perspective view of a typical power unit stand suitable for supporting the power unit of the pump assembly.
Figure 10:
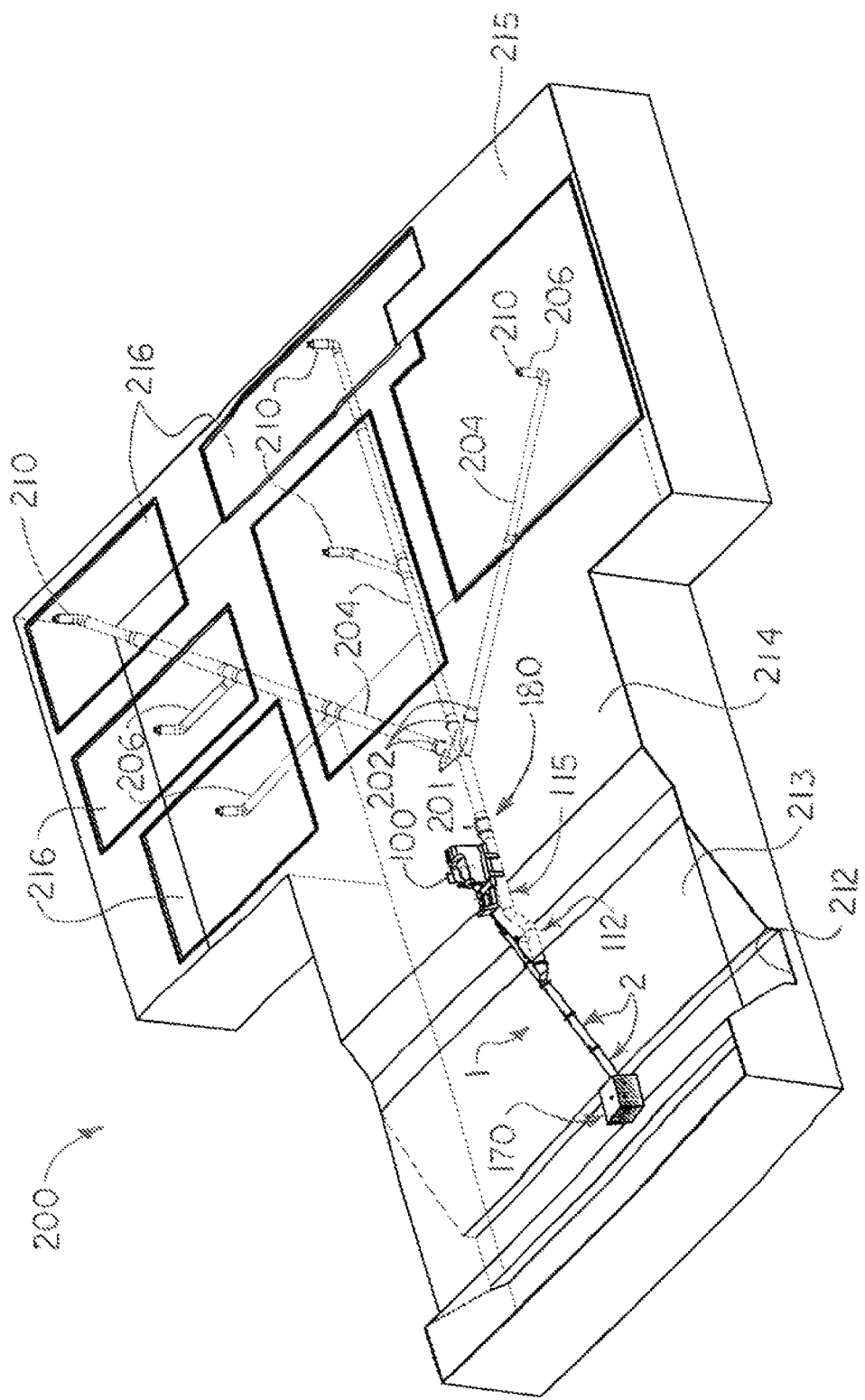
FIG. 10 is a perspective view of an illustrative embodiment of the water pumping and distribution systems in typical application of the pump assembly.
Figure 11:
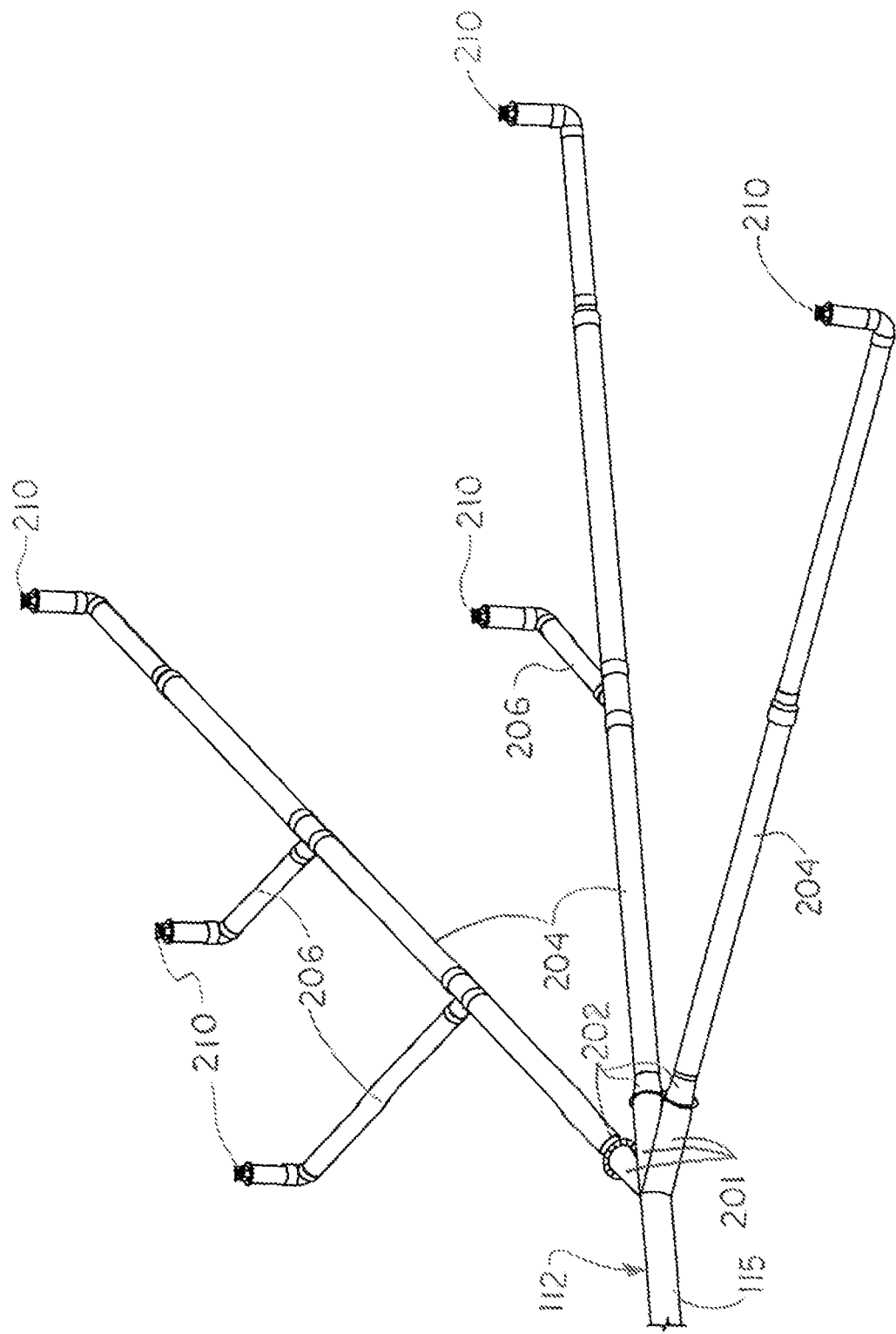
FIG. 11 is a perspective view, partially in section, of a typical array of primary discharge conduits extending from the drain conduit of the pump assembly and secondary discharge conduits extending from the primary discharge conduit according to some embodiments of the water pumping and distribution systems.

Referring initially to FIGS. 1-14 of the drawings, an illustrative embodiment of the Louie pump assemblies of the disclosure is generally indicated by reference numeral 1. As illustrated in FIGS. 10 and 11 and will be hereinafter described, in typical application, the pump assembly 1 may be suitably configured for a water pumping and distribution system 200. The pump assembly 1 may include a pumping unit 34 operable to pump water. As illustrated in FIG. 7, the pumping unit 34 may have a longitudinal pumping unit axis 136. A pump drive unit 8 of the pump assembly 1 may include a pump shaft housing 80. At least one shaft bearing 85 may be provided in the pump shaft housing 80. A pump shaft 52 may engage the shaft bearing or bearings 85 in the pump shaft housing 80. The pump shaft 52 may drivingly engage the pumping unit 34. A power unit 100 may drivingly engage the pump shaft 52 for rotation typically through a drive shaft 105. The power unit 100 may include an electric, diesel or natural gas engine, for example and without limitation.

A drain conduit 112, having a drain conduit wall 118, may include a drain conduit inlet segment 113 which may be disposed in fluid communication with the pumping unit 34 and the pump shaft housing 80 of the pump drive unit 8. As further illustrated in FIG. 7, the drain conduit inlet segment 113 of the drain conduit 112 may have a longitudinal drain conduit axis 137 which may be disposed at an obtuse drain conduit inlet angle 73 with respect to the longitudinal pumping unit axis 136 of the pumping unit 34.

A drain conduit ascending segment 114 may be disposed in fluid communication with and ascend from the drain conduit inlet segment 113 of the drain conduit 112. The drain conduit ascending segment 114 may be disposed at an obtuse ascending segment angle 139 to the drain conduit inlet segment 113.

A drain conduit terminal segment 115 of the drain conduit 112 may be disposed in fluid communication with the drain conduit ascending segment 114. The drain conduit terminal segment 115 may be disposed at an obtuse terminal segment angle 140 with respect to the drain conduit ascending segment 114. The drain conduit terminal segment 115 may be disposed at a valve segment level 117 which is above at least one shaft bearing 85 in the pump shaft housing 80. Accordingly, backflow water 144 flowing through the drain conduit terminal segment 115, the drain conduit ascending segment 114 and the drain conduit inlet segment 113, respectively, may flow into the pump shaft housing 80 and contact the shaft bearing 85 to cool the shaft bearing 85. In some embodiments, the drain conduit inlet segment 113, the drain conduit ascending segment 114 and the drain conduit terminal segment 115 of the drain conduit 112 may have a diameter of 18".

Figure 1:
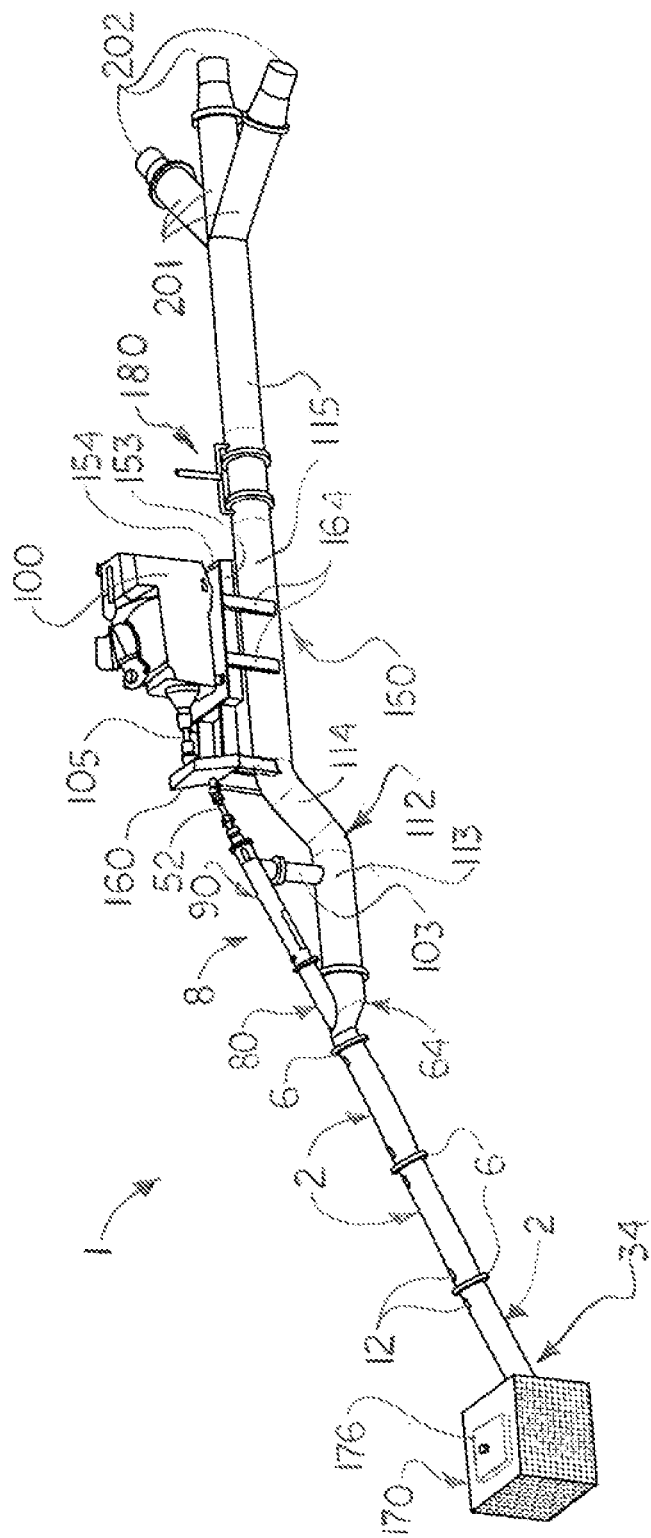
FIG. 1 is a perspective view of an illustrative embodiment of the Louie pump assemblies of the disclosure.

As illustrated in FIGS. 1, 10 and 11, in some embodiments, at least one, and typically, multiple diversion conduits 201 may branch from the drain conduit terminal segment 115 of the drain conduit 112. A conduit coupling 202, the purpose of which will be hereinafter described, may be provided on each diversion conduit 201. In some embodiments, each conduit coupling 202 may include a valve such as a WATERMAN™ Alfalfa Valve, for example and without limitation.

Figure 8:
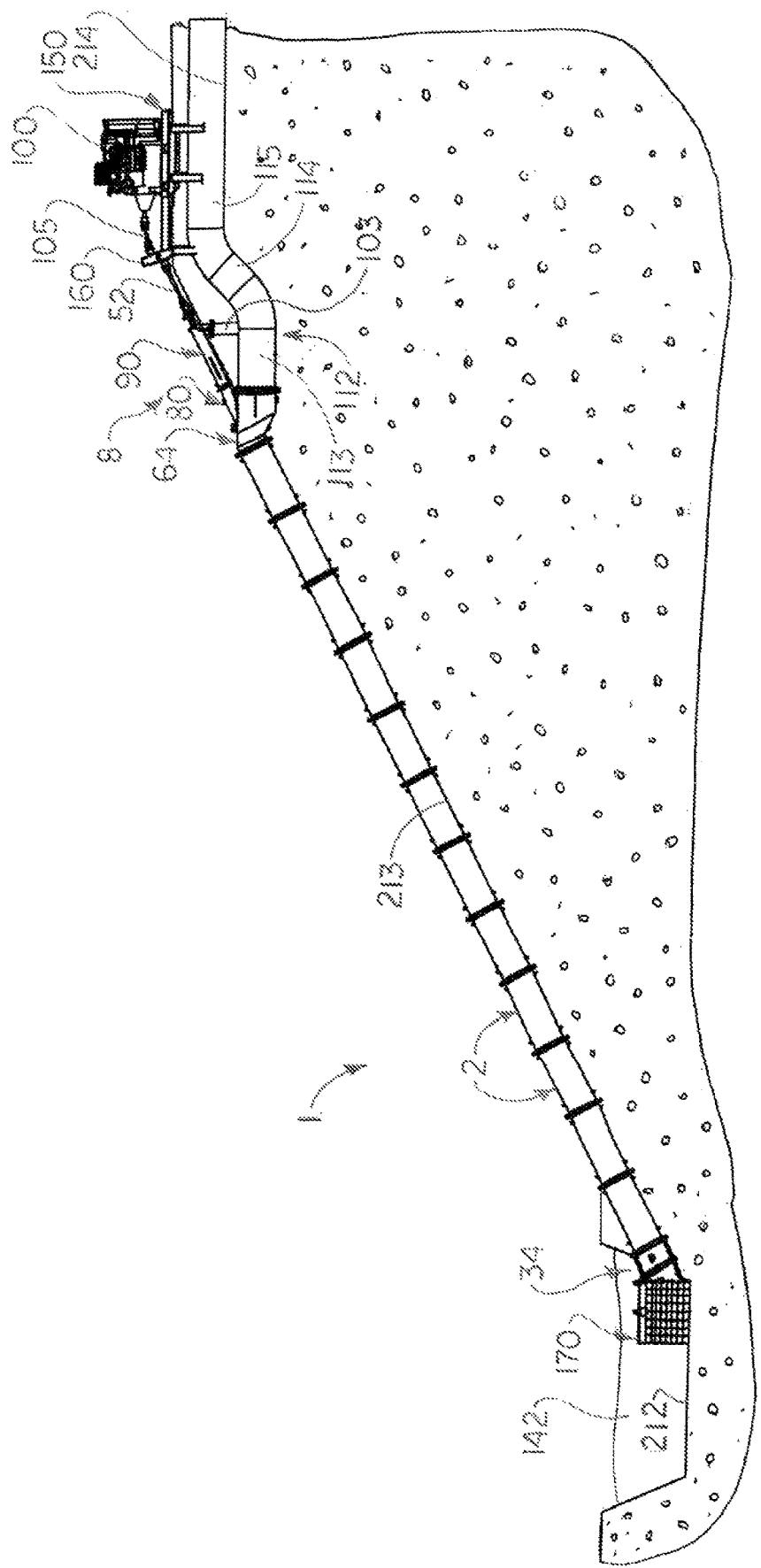
FIG. 8 is a side view of the illustrative pump assembly, installed as part of a water pumping and distribution system of the disclosure in typical application of the pump assembly.

As illustrated in FIGS. 8, 10 and 11, in typical application, which will be hereinafter further described, the pump assembly 1 may be installed to pump floodwater or other liquid 142 from a ditch 212 to at least one irrigation field 216 on a plain 215. A slope 213 may extend upwardly from the ditch 212. Elevated ground 214, which in some embodiments, may be a levee, may extend adjacent to and away from the slope 213. The plain 215 may spread adjacent to and away from the elevated ground 214. Accordingly, in the installed pump assembly 1, the pumping unit 34 may extend up and along the slope 213. The pump drive unit 8 may extend within or along the elevated ground 214. The drain conduit 212 may extend within or along the elevated ground 214 to the plain 215.

At least one primary discharge conduit 204 may extend from the drain conduit 212. In some embodiments, each primary discharge conduit 204 may be attached to a corresponding diversion conduit 201 via the corresponding conduit coupling 202. At least one secondary discharge conduit 206 may extend from the primary discharge conduit 204. Each secondary discharge conduit 206 may discharge at a corresponding irrigation field 216. The pump assembly 1 may thus be operable to pump the floodwater 142 from the ditch 212 and discharge the floodwater 142 onto the irrigation field 216 for irrigation purposes. In some embodiments, each primary discharge conduit 204 and each secondary discharge conduit 206 may have a diameter of 15".

As used herein. "downstream" refers to the position or location of an element or component which is closer to the irrigation field or fields 216 on the plain 215 than the ditch 212 relative to another element or component in the pump assembly 1 or the water pumping and distribution system 200. Conversely, "upstream" refers to the position of an element or component which is closer to the ditch 212 relative to the irrigation field or fields 216 on the plain 215 relative to another element or component in the pump assembly 1 or the water pumping and distribution system 200.

The pumping unit 34 of the pump assembly 1 may have any design which is suitable for the purpose of pumping water therethrough from a water source to a discharge location for the water. For example and without limitation, in some embodiments, the pumping unit 34 may have a design which is the same as or similar to that of the pumping unit which is described in co-pending U.S. application Ser. No. 16/875,190, filed May 15, 2020, which application is hereby incorporated by reference herein in its entirety. Accordingly, as illustrated in FIG. 7, the pumping unit 34 may include a pumping unit housing 35 having a pump intake end 39 and a pump outlet end 40. At least one pumping unit impeller 36, typically having an impeller hub 42 drivingly engaged by an impeller shaft 37 and at least one impeller blade 38 extending from the impeller hub 42, may be disposed in the pumping unit housing 35. The impeller shaft 37 may be drivingly coupled to and engaged for rotation by the pump shaft 52 of the pump drive unit 8 according to the knowledge of those skilled in the art. At least one pumping unit diffuser 20 may be provided in the pumping unit housing 35 between the pumping unit impeller 36 and the pump outlet end 40. The pumping unit diffuser 20 may have a diffuser hub 28 drivingly engaged for rotation by the pump shaft 52 or the impeller shaft 37 and at least one diffuser vein 30 which extends from the diffuser hub 28. In some embodiments, the pumping unit diffuser 20 may be disposed in a diffuser housing 21 which is separate from and attached to the pumping unit housing 35. In some embodiments, the pumping unit impeller 36 may be disposed in an impeller housing (not illustrated) which is separate from the diffuser housing 21. The diffuser housing 21 of the pumping unit diffuser 20 and the impeller housing of the pumping unit impeller 36 may be part of or separate from and attached to the pumping unit housing 35.

As further illustrated in FIG. 7, in some embodiments, an intake cap 54 may be detachably attached to the pump intake end 39 of the pumping unit housing 35 of the pumping unit 34. The intake cap 54 may be selectively removed from the pump intake end 39 to facilitate access to the pumping unit diffuser 20, the pumping unit impeller 36, the impeller shaft 37 and/or other interior components of the pumping unit 34 for repair, maintenance and/or replacement purposes.

Figure 2:
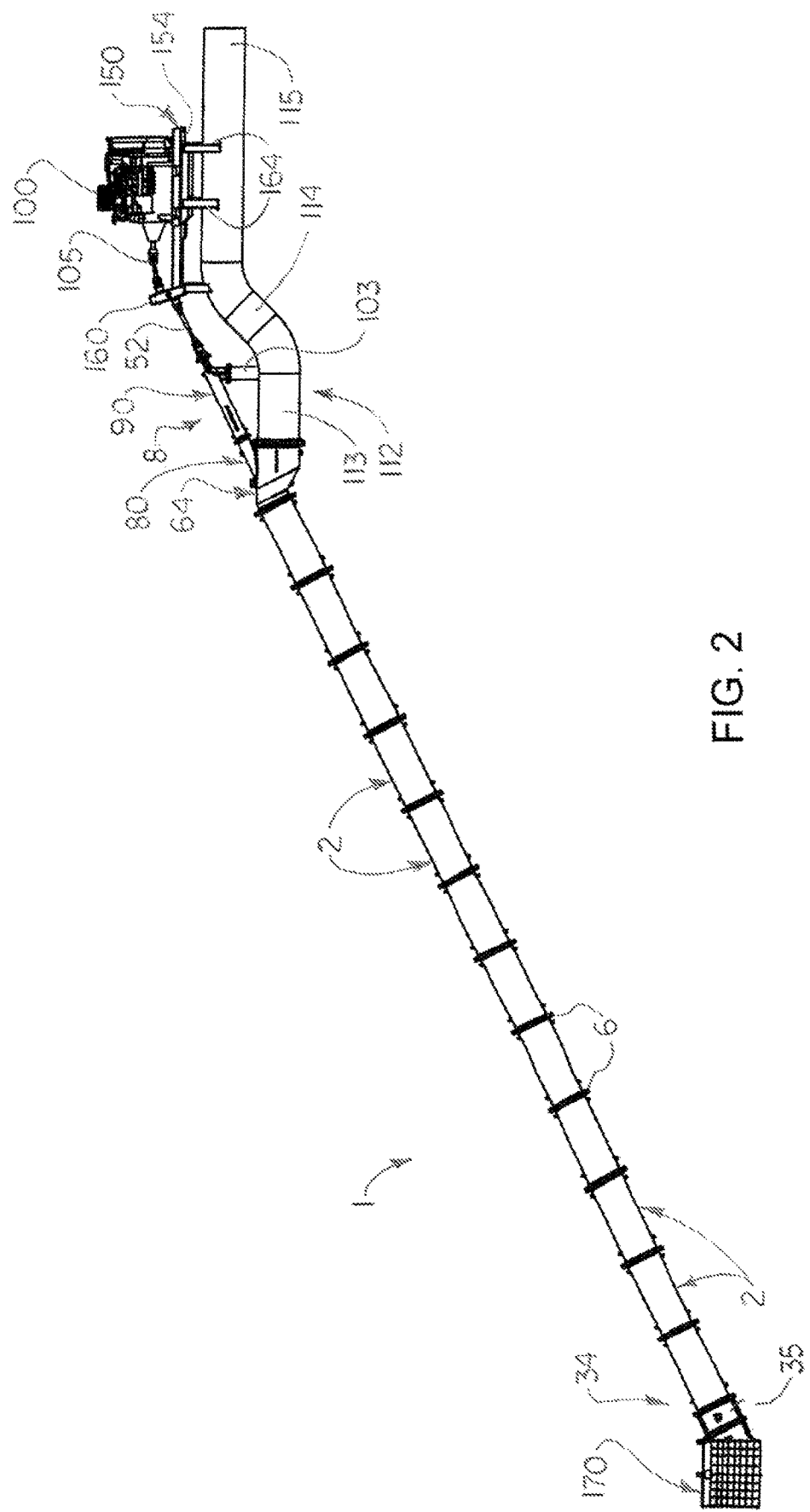
FIG. 2 is a side view of the illustrative pump assembly illustrated in FIG. 1.
Figure 4:
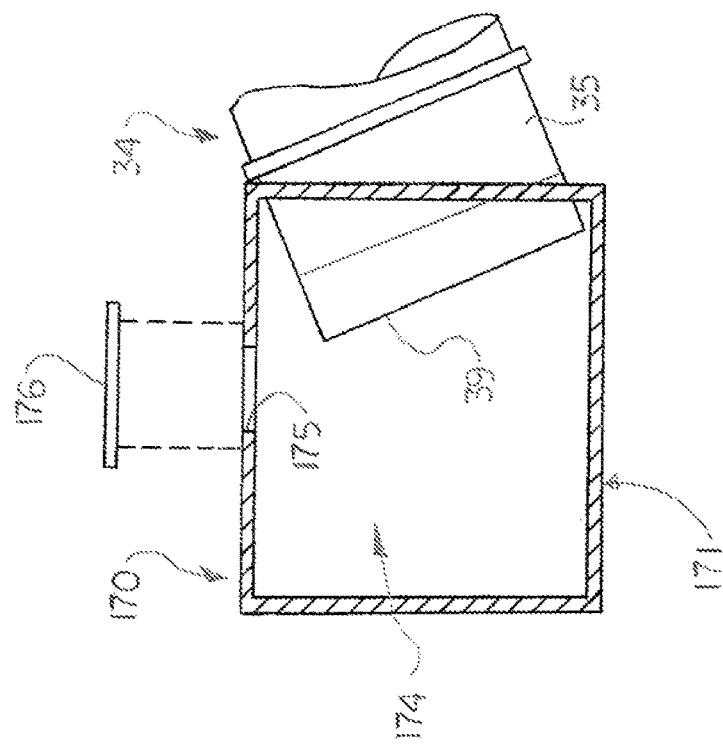
FIG. 4 is a sectional view of the cavitation cage illustrated in FIG. 3, with the pump intake end of the pump assembly disposed inside the cavitation cage.
Figure 3:
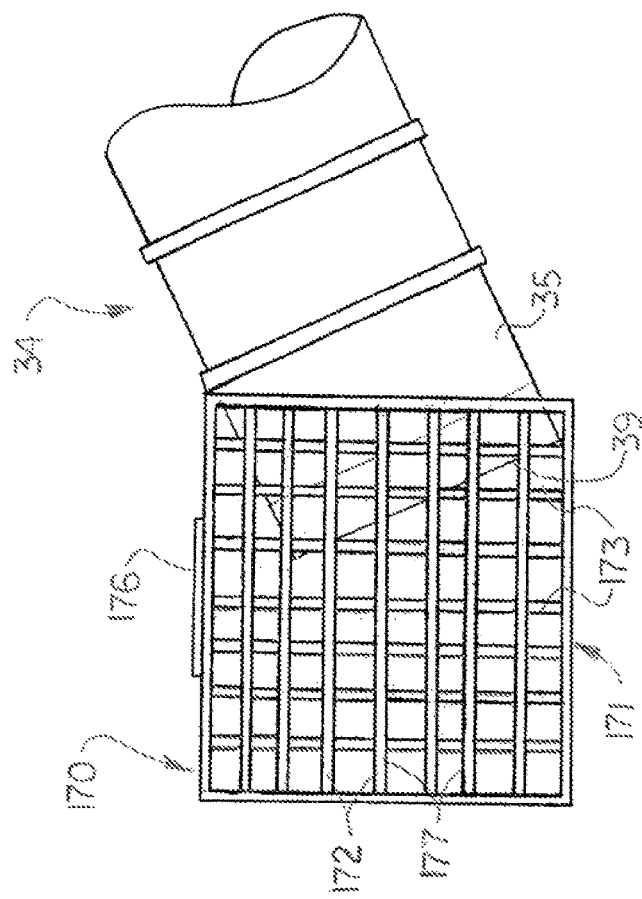
FIG. 3 is a side view of a typical cavitation cage attached to the pump intake end of the illustrative pump assembly (shown partially in section)

As illustrated in FIGS. 1-4, in some embodiments, a cavitation cage 170 having a plurality of cage openings 177 may be disposed in fluid communication with the pump intake end 39 of the pumping unit housing 35. As illustrated in FIGS. 3 and 4, the cavitation cage 170 may have a cavitation cage frame 171. In some embodiments, the cavitation cage frame 171 may have multiple horizontal frame members 172 and intersecting vertical frame members 173. The cage openings 177 may be formed by and between the horizontal frame members 172 and the vertical frame members 173.

As illustrated in FIG. 4, the cavitation cage 170 may have a cage interior 174 which communicates with the cage openings 177. The pump intake end 39 of the pumping unit housing 35 may be disposed in fluid communication with the cage interior 174. In some embodiments, the pump intake end 39 may protrude into the cage interior 174, as illustrated in FIGS. 3 and 4. A suction opening 175 may be provided in the top of the cavitation cage frame 171. A cage cover 176 may be suitably configured to close and seal the suction opening 175 according to the knowledge of those skilled in the art.

In some embodiments, at least one pump extension 2 may have a pump extension housing 3 which extends from the pump outlet end 40 of the pumping unit housing 35. The pump shaft 52 may extend through the pump extension housing 3. Accordingly, the pump extension or extensions 2 may be used to selectively extend the length of the pumping unit 34, as illustrated in FIG. 8, typically depending on the length of the slope 213 between the ditch 212 and the elevated ground 214. The pump extension housings 3 of the pump extensions 2 may be coupled to each other via coupling flanges 6 with bolts and/or other suitable connection.

In some embodiments, at least one deployment flange 12 may be provided on the exterior surface of the pump extension housing or housings 3 of the pump extension or extensions 2 of the pumping unit 34 and the other components of the pump assembly 1 for attachment to a crane or other support vehicle or structure (not illustrated) in deployment of the pump assembly 1 in place.

As illustrated in FIG. 7, at least one shaft bearing 15 may be disposed in the pump extension housing interior 10 of the pump extension housing 3 of each pump extension 2. Shaft vanes 14 may extend from the interior surface of the pump extension housing 3 to the shaft bearing 15 to centralize the shaft bearing 15 in the pump extension interior 10 as the impeller shaft 52 extends through the shaft bearing 15.

As further illustrated in FIG. 7, a main pump housing 64 may include an intake pump housing segment 66 disposed in fluid communication with the pumping unit housing 35 of the pumping unit 34, either directly or through one or more of the pump extensions 2, as illustrated. The intake pump housing segment 66 may have a main housing intake end 69 which is configured for coupling to the pump extension 2 through a flanged and bolted and/or other suitable connection. A middle pump housing segment 67 may be disposed in fluid communication with the intake pump housing segment 66. The middle pump housing segment 67 may be disposed at an obtuse angle with respect to the intake pump housing segment 66. An outlet pump housing segment 68 may be disposed in fluid communication with the middle pump housing segment 67. The outlet pump housing segment 68 may be disposed in substantially linear alignment with the middle pump housing segment 67. The outlet pump housing segment 68 may have a main housing outlet end 70 which is configured for coupling to the drain conduit 112 through a flanged and bolted and/or other suitable connection.

A main pump housing interior 71 may be formed by the intake pump housing segment 66, the middle pump housing segment 67 and the outlet pump housing segment 68. A shaft housing segment 74 may extend from the outlet pump housing segment 68. The shaft housing segment 74 may be disposed in fluid communication with the main pump housing interior 71 and substantially in linear alignment with the intake pump housing segment 66. Accordingly, the drain conduit inlet segment 113 of the drain conduit 112 may extend from the outlet pump housing segment 68 of the main pump housing 64. The pump shaft housing 80 of the pump drive unit 8 may extend from the shaft housing segment 74 of the main pump housing 64, with the pump shaft 52 typically extending through a pump shaft housing interior 84 of the pump shaft housing 80, the shaft housing segment 74 and the intake pump housing segment 66 of the main pump housing 64. The pump shaft housing 80 may be attached to the shaft housing segment 74 of the main pump housing 64 via a distal housing flange 75.

In some embodiments, a shaft input housing 90 may extend from the pump shaft housing 80 of the pump drive unit 8. Accordingly, the pump shaft 52 may extend through a shaft input housing interior 96 of the shaft input housing 90. The shaft input housing 90 may be attached to the pump shaft housing 80 of the pump drive unit 8 via a proximal input shaft housing flange 92. As illustrated in FIGS. 1, 2 and 8, in some embodiments, at least one pump drive unit support structure 103 may extend typically between the drain conduit inlet segment 113 of the drain conduit 112 and the shaft input housing 90. A shaft input flange support 94 may extend from a distal shaft input housing end 91 of the shaft input housing 90. A shaft input flange 93 may be supported by the shaft input flange support 94. The pump shaft 52 may extend into the shaft input housing interior 96 of the shaft input housing 90 through the shaft input flange 93 and the shaft input flange support 94, respectively, and typically through a drive shaft bearing 95 in the distal input housing end 91 of the shaft input housing 90. In some embodiments, the shaft housing segment 74 of the main pump housing 64 and the pump shaft housing 80 and the shaft input housing 90 of the pump drive unit 8 may have a diameter of 12".

In some embodiments, a flange mount 99 may extend from the shaft input housing 90 at the distal housing input housing end 91. The flange mount 99 may be disposed at an acute angle to the longitudinal axis of the shaft input housing 90. At least one housing mount flange 98 may terminate the flange mount 99 for typically flanged attachment to the pump drive unit support structure 103 for the pump drive unit 8 in some applications.

Figure 5:
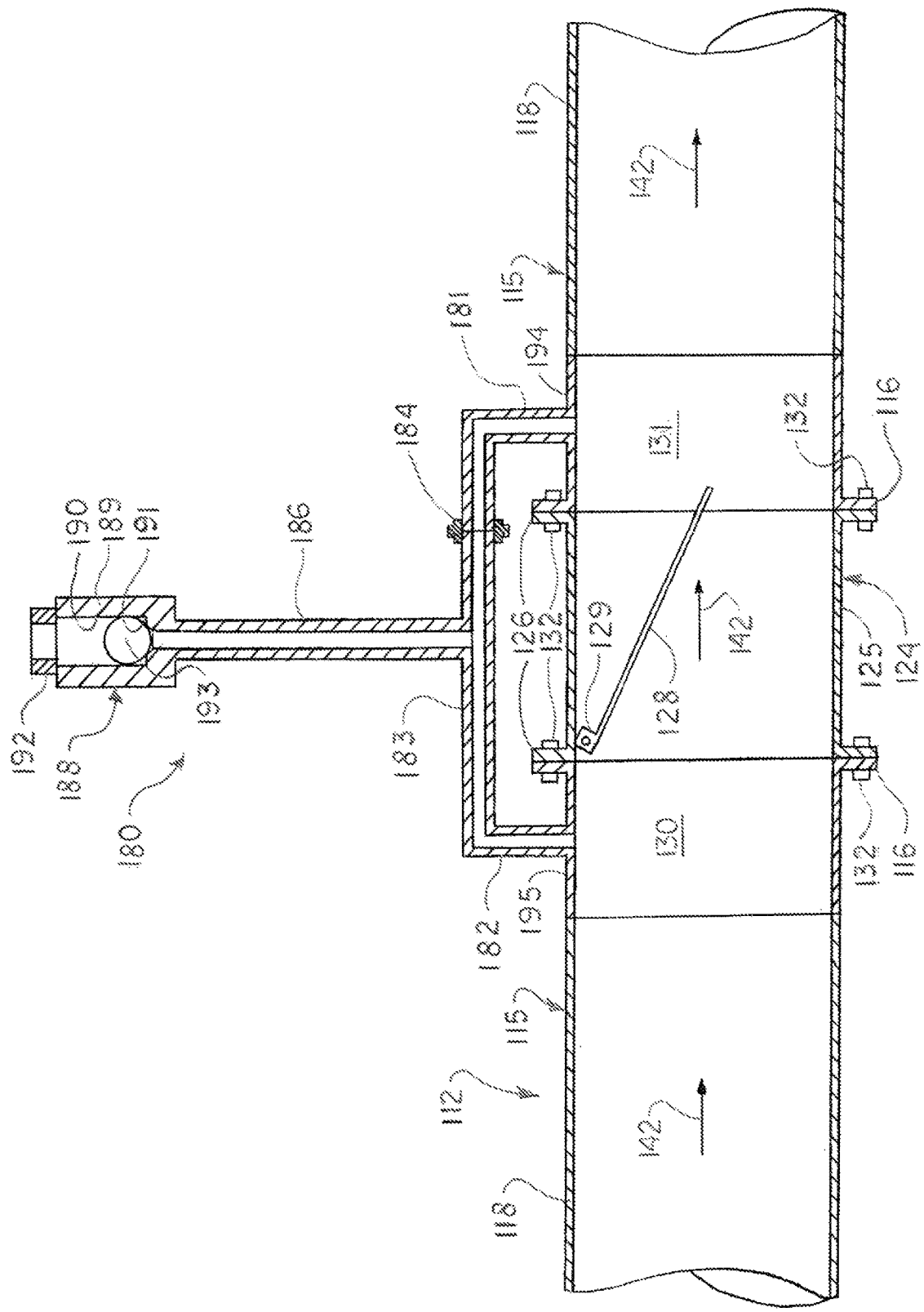
FIG. 5 is a sectional view of a typical water diverting assembly of the illustrative pump assembly, with the flow control valve of the water diverting assembly in an open position to facilitate forward directional flow of floodwater through the drain conduit of the pump assembly.
Figure 6:
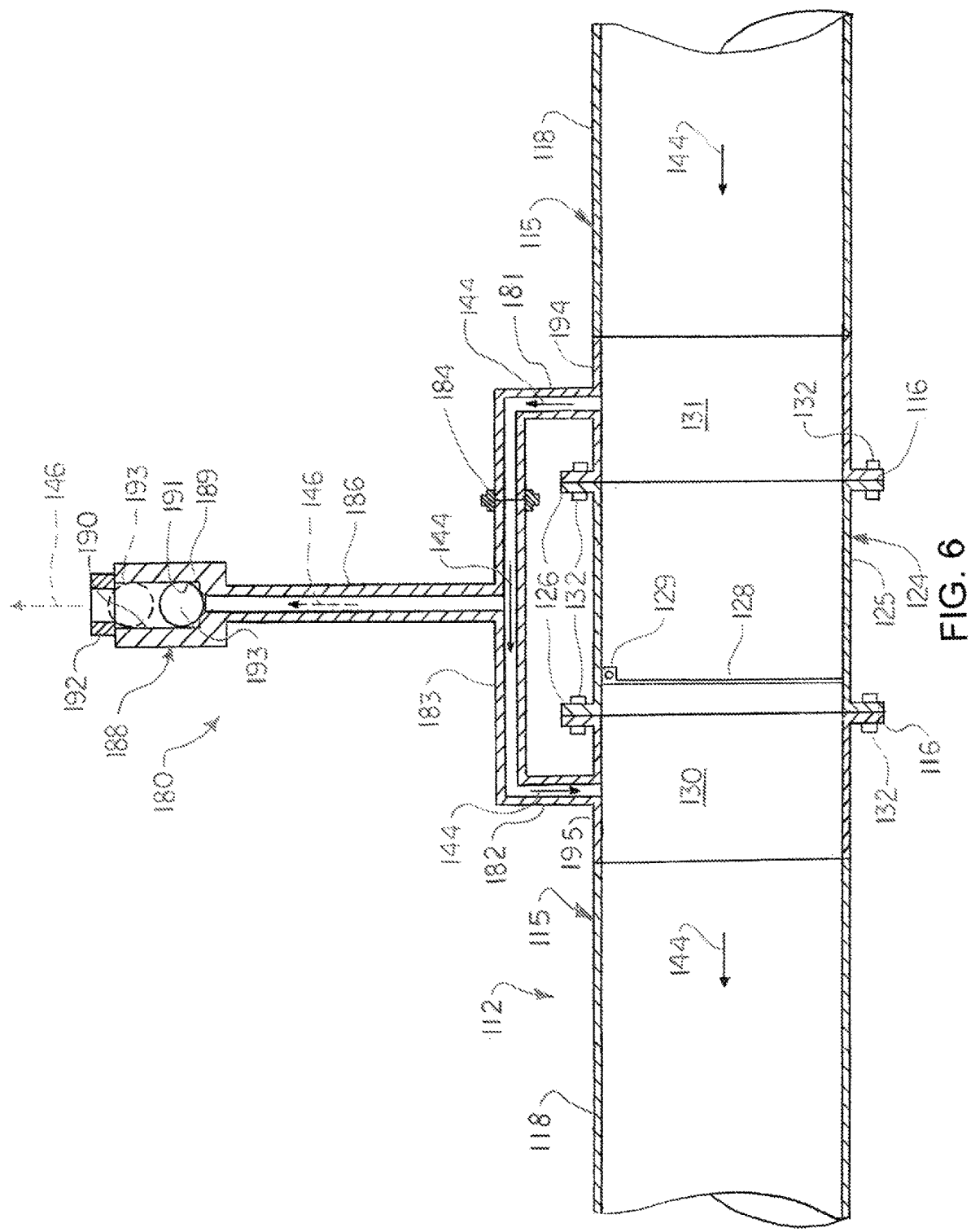
FIG. 6 is a sectional view of the water diverting assembly illustrated in FIG. 5, with the flow control valve in a closed position to block forward directional flow of floodwater through the drain conduit of the pump assembly and allow reverse directional flow of the floodwater through the water diverting assembly.
Figure 7:
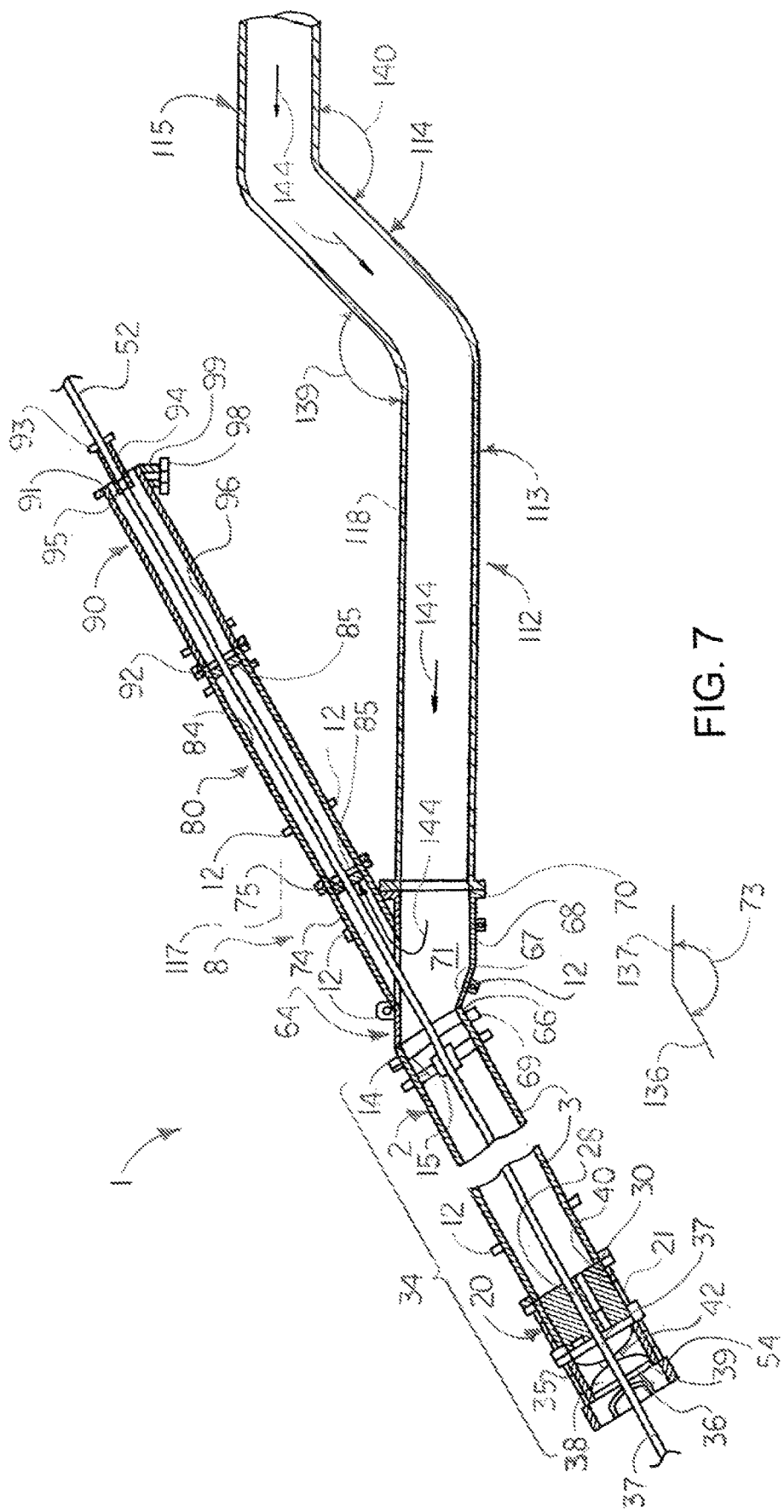
FIG. 7 is a longitudinal sectional view of the pump assembly, more particularly illustrating typical reverse flow of floodwater through the drain conduit to lubricate a shaft bearing in the impeller shaft housing of the levee pump of the pump assembly.

As illustrated in FIGS. 5 and 6, at least one flow control valve 124 may be disposed in the drain conduit 112. The flow control valve 124 may be configured to facilitate unidirectional flow of the floodwater 142 through the drain conduit 112. The flow control valve 124 may have an upstream side 130 and a downstream side 131. A valve wall 125 may be attached to the drain conduit wall 118 of the drain conduit terminal segment 115 of the drain conduit 112 such as via valve flanges 126 secured to respective terminal segment flanges 116 typically using flange fasteners 132. A valve flap 128 may be disposed in the valve wall 125 between the upstream side 130 and the downstream side 131 of the flow control valve 124. A valve flap hinge 159 may pivotally attach the valve flap 128 to the interior surface of the valve wall 125. Accordingly, the valve flap 128 may be positional in an open position illustrated in FIG. 5 to facilitate the unidirectional flow of the floodwater 142 through the drain conduit 112 and in a closed position illustrated in FIG. 6 to prevent backflow water 144 from flowing in the reverse direction through the drain conduit 112.

As further illustrated in FIGS. 5 and 6, a valve bypass assembly 180 may be disposed in fluid communication with the drain conduit 112 on the upstream side 130 and the downstream side 131 of the flow control valve 124. The valve bypass assembly 180 may be configured to facilitate bypass of the backflow water 144 with respect to the flow control valve 124 in the drain conduit 112, typically after shutoff of the pumping unit 34 of the pump assembly 1.

In some embodiments, the valve bypass assembly 180 may include a bypass assembly inlet segment 181 disposed in fluid communication with the drain conduit 112 on the downstream side 131 of the at least one flow control valve 125. A valve bypass segment 183 may be disposed in fluid communication with the bypass assembly inlet segment 181. A bypass assembly outlet segment 182 may be disposed in fluid communication with the valve bypass segment 183 and with the drain conduit 112 on the upstream side 130 of the flow control valve 124. A typically galvanized pipe union 184 may connect separate segments of the valve bypass segment 183 to each other. In some embodiments, an elongated vent segment 186 may extend upwardly from the valve bypass segment 183. In some embodiments, the bypass assembly inlet segment 181 and the bypass assembly outlet segment 182 may extend from an inlet conduit portion 194 and an outlet conduit portion 195, respectively, in the drain conduit terminal segment 115 of the drain conduit 112. The bypass assembly inlet segment 181, the bypass assembly outlet segment 182 and the valve bypass segment 183 of the valve bypass assembly 180 may each have a diameter of 2" in some embodiments.

At least one air vent 188 may be disposed in pneumatic communication with the valve bypass segment 183. In some embodiments, the air vent 188 may include an air vent housing 189 having an air vent interior 190. A valve seat 191 may be provided in the air vent housing 189 at the bottom of the air vent interior 190. A valve cap 192 may be provided on the air vent housing 189 above the valve seat 191. A valve ball 193 may normally be seated against the valve seat 191 by gravity. Accordingly, responsive to influx of air 146 rising in the vent segment 186, the valve ball 193 may be unseated from the valve seat 191 to facilitate flow of the air 146 around the unseated valve ball 193 out the valve cap 192.

As illustrated in FIGS. 10 and 11, in some embodiments, multiple primary discharge conduits 204 may branch from the discharge conduit terminal segment 115 of the drain conduit 112. Multiple secondary discharge conduits 206 may branch from the primary discharge conduit or conduits 204. A discharge head 210 may terminate each secondary discharge conduit 206. Each discharge head 210 may be configured to discharge the pumped floodwater 142 into the soil at each corresponding irrigation field 216. Alternatively, the discharge heads 210 may protrude above the surfaces of the respective irrigation fields 216 to spray the floodwater 142 onto the surface of the soil in the irrigation field 216 or onto crop plants (not illustrated) growing in the soil in each irrigation field 216.

As illustrated in FIGS. 1 and 2, a power unit stand 150 may be supported by the drain conduit 112. The power unit 100 may be supported by the power unit stand 150. As illustrated in FIG. 9, in some embodiments, the power unit stand 150 may include a main stand frame 151. A front stand frame 158 may extend from the main stand frame 151. The main stand frame 151 may include a pair of spaced-apart rear frame legs 164 and a pair of spaced-apart middle frame legs 165. A pair of elongated, parallel, spaced-apart side frame members 152 may extend between the rear frame legs 164 and the respective middle frame legs 165. In some embodiments, at least one leg attachment flange 167 may be provided on each rear frame leg 164 and each middle frame leg 165. A pair of spaced-apart top frame members 153 may be supported by the respective side frame members 152. A rear frame member 154 may extend between the top frame members 153. The power unit 100 may be supported by and attached to the top frame members 153 and the rear frame member 154 of the main stand frame 151 using bolts, brackets, and/or other mechanical fasteners according to the knowledge of those skilled in the art.

The front stand frame 158 of the power unit stand 150 may include a pair of elongated, parallel, spaced-apart front frame members 159 which extend forwardly of the top frame members 153 of the main stand frame 151. At least one spanning frame member 162 may extend between the front frame members 159. A pair of front frame legs 166 may extend downwardly from the forward ends of the respective front frame members 159. A pair of spaced-apart pump shaft support members 160 may extend upwardly from the respective front frame legs 166. A pair of registering pump shaft support member openings 161 may be provided in the respective drive shaft support members 160. A pump shaft support member (not illustrated) may extend through the registering pump shaft support member openings 161. The pump shaft support member may be configured to support the pump shaft 52 of the pump drive unit 8 according to the knowledge of those skilled in the art.

Figure 14:
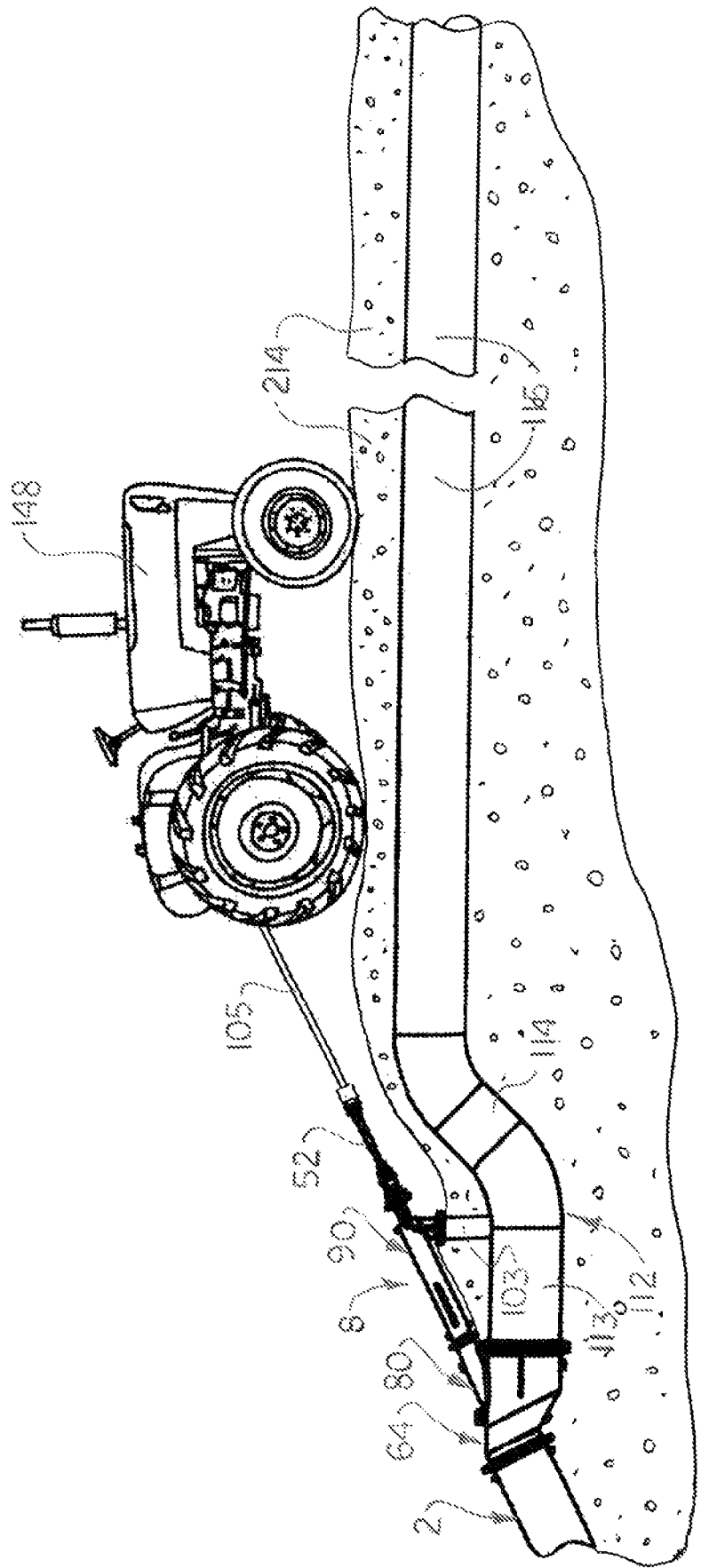
FIG. 14 is a side view of the drain conduit of the pump assembly deployed in place in the water pumping and distribution system and a tractor drivingly engaging the impeller shaft of the pump assembly in an alternative application of the pump assembly.

As illustrated in FIGS. 12-14, in some embodiments, the rear frame legs 164, the middle frame legs 165 and the front frame legs 166 of the power unit stand 150 may be detachably attachable to the drain conduit 112 according to the knowledge of those skilled in the art. Accordingly, as illustrated in FIG. 12, the power unit stand 150 may be attached to the drain conduit 112 to support the power unit 100. This may be accomplished by, for example and without limitation, bolted and/or other attachment of the leg attachment flanges 167 on the rear frame legs 164 and the middle frame legs 165 typically to the drain conduit terminal segment 115 of the drain conduit 112. The drive shaft 105 of the power unit 100 may be coupled to the pump shaft 52 of the pump drive unit 8 to facilitate rotation of the pumping unit impeller 36 (FIG. 7) in the pumping unit housing 35 of the pumping unit 34 and facilitate pumping of the floodwater 142 through the pumping unit 34, the main pump housing 64 and the drain conduit 112, respectively.

As illustrated in FIG. 13, in some applications, the rear frame legs 164, the middle frame legs 165 and the front frame legs 166 of the power unit stand 150 may be detached from the drain conduit 112 and the drive shaft 105 uncoupled from the pump shaft 52. The power unit stand 150, with the power unit 100 thereon, may be removed from the drain conduit 112. As illustrated in FIG. 14, a tractor 148 may be maneuvered into place on the elevated ground 214. A tractor driveshaft 149 which is drivingly engaged for rotation by the tractor 148 may be coupled to the pump shaft 52. Accordingly, the tractor 148 may be operated to rotate the pump shaft 52 for operation of the pump drive unit 8 via the drive shaft 105.

In typical application, the pump assembly 1 may be assembled and installed as part of the water pumping and distribution system 200. Accordingly, the cavitation cage 170 may be submerged beneath the floodwater 142 in the ditch 212. In some applications, particulate water filtration material (not illustrated) such as sand, rocks and/or gravel, for example and without limitation, may be placed over the ditch 212 and beneath the floodwater or other liquid 142 for water filtration purposes. The pumping unit 34 may be placed in fluid communication with the cage interior 174 of the cavitation cage 170. The pumping unit 34 may be placed against or buried beneath the surface of the slope 213 which extends from the ditch 212. In some applications, one or more of the pump extensions 2 may be attached to the pumping unit 34 typically depending on the length of the slope 213. The assembled pump assembly 1 may be erected and deployed in place by engagement of cables on a crane or other support or lifting vehicle or structure (not illustrated) with the deployment flanges 12 on the pump extension or extensions 2, the main pump housing 64, the impeller shaft housing 80 and the shaft input housing 90.

The drain conduit 112 of the pump assembly 1 may be placed against or buried beneath the surface of the elevated ground 214. The pump drive unit support structure 103 may be attached to the housing mount flange 98 (FIG. 7) to support the shaft input housing 90 of the pump drive unit 8 on the drain conduit 112.

The stand 150 may be placed on the drain conduit terminal segment 115 of the drain conduit 112. In some applications, the rear frame legs 164, middle frame legs 165 and front frame legs 166 may be attached to the drain conduit 112, typically as was heretofore described. The power unit 100 may be placed on the power unit stand 150. The drive shaft 105 of the power unit 100 may be drivingly coupled to the pump shall 52 of the pump drive unit 8.

The flow control valve 124 may be deployed in place in the drain conduit terminal segment 115 of the drain conduit 112. The valve bypass assembly 180 may be deployed in place at the upstream side 130 and the downstream side 131 of the flow control valve 124.

As illustrated in FIGS. 10 and 11, the primary discharge conduits 204 may be attached to the respective diversion conduits 201 on the drain conduit 112 typically via the respective conduit couplings 202. At least one secondary discharge conduit 206 may be attached to each primary discharge conduit 204. A discharge head 210 may be attached to each secondary discharge conduit 206. In some applications, each discharge head 210 may terminate beneath the surface of the soil at each corresponding irrigation field 216. In other applications, each discharge head 210 may protrude above the soil surface of each irrigation field 216. In some applications, crop plants (not illustrated) may be planted in the soil at each irrigation field 216.

The power unit 100 may be operated to rotate the drive shaft 105, which may transmit rotation to the impeller shaft 52 typically through a suitable shaft coupling (not illustrated). The impeller shaft 52 may rotate the pumping unit impeller 36 in the pumping unit housing 35 of the pumping unit 34. Accordingly, the pumping unit 34 may draw the water and/or other liquid 142 through the water filtration material 140 into the ditch 108. Simultaneously, the impeller blades 38 (FIG. 7) of the impeller 36 may draw the water or other liquid 142 from the ditch 108 through the suction opening 175 and the cage openings 177 in the cavitation cage 170 and then through the intake cap 54, the pumping unit impeller 36, the pumping unit diffuser 20 and the pump extension 2, respectively, of the pumping unit 34. The pumping unit diffuser 20 may reduce the flow velocity of the floodwater 142, resulting in an increase in pressure in the floodwater 142 through the remaining portion of the pump drive unit 8. The water or other liquid 142 may then flow through the intake pump housing segment 66, the middle pump housing segment 67 and the outlet pump housing segment 68, respectively, of the main pump housing 64 and through the drain conduit inlet segment 113, the drain conduit ascending segment 114 and the drain conduit terminal segment 115, respectively, of the drain conduit 112 and through the diversion conduits 201, the primary discharge conduits 204 and the secondary discharge conduits 206. The floodwater 142 may be discharged from the secondary discharge conduits 206 through the discharge heads 210 into the respective irrigation fields 216 on the plain 215. As the water and/or other liquid 142 flows from the area to be drained through the water filtration material to the ditch 212, a substantial quantity of impurities may be removed from the water and/or other liquid 142 before it is transported to and discharged into the irrigation fields 216. This expedient may substantially reduce the environmental impact of the water and/or other liquid 142 in the irrigation fields 216. In some applications, the floodwater 142 discharged from the drain conduit 112 may serve as a source of potable water for homes, businesses or communities.

Under some circumstances, it may be necessary or desirable to terminate operation of the power unit 100 and pumping of the floodwater 142 from the ditch 212 to the irrigation fields 216. Accordingly, as illustrated in FIG. 6, after operation of the power unit 100 is terminated, the valve flap 128 may be deployed from the open position to the closed position in the valve wall 125 of the flow control valve 124. This may facilitate flow of backflow water 144 which remains in the drain conduit terminal segment 115 of the drain conduit 112 in the reverse direction through the drain conduit terminal segment 115. The backflow water 144 in the drain conduit terminal segment 115 may flow from the upstream side 130 of the flow control valve 124 through the bypass assembly inlet segment 181, the valve bypass segment 183 and the bypass assembly outlet segment 182, respectively, back into the drain conduit terminal segment 115 at the downstream side 131 of the flow control valve 124. As illustrated in FIG. 6, air 146 in the bypass assembly inlet segment 181 and/or the valve bypass segment 183 may be discharged through the vent segment 186 and from the air vent 188 typically by displacing the valve ball 193 from the valve seat 191 in the air vent interior 190 of the air vent housing 189.

As illustrated in FIG. 7, the backflow water 144 may flow through the drain conduit terminal segment 115, the drain conduit ascending segment 114 and the drain conduit inlet segment 113, respectively, of the drain conduit 112. Gravity may pull the backflow water 144 in the reverse direction down the ascending segment 114 and then into the pump shaft housing 80 of the pump drive unit 8 of the pump assembly 1, where the backflow water 144 may contact at least one of the shaft bearings 85 in the pump shaft housing 80 to cool the shaft bearing or bearings 85.

As illustrated in FIGS. 12-14, in some applications, the rear frame legs 164, the middle frame legs 165 and the front frame legs 166 of the power unit stand 150 may be detached from the drain conduit 112 and the drive shall 105 uncoupled from the pump shaft 52. The power unit stand 150, with the power unit 100 thereon, may be removed from the drain conduit 112. As illustrated in FIG. 14, the tractor 148 may be maneuvered into place on the elevated ground 214. The tractor driveshaft 149 which is drivingly engaged for rotation by the tractor 148 may be coupled to the pump shaft 52. Accordingly, the tractor 148 may be operated to rotate the pump shaft 52 for operation of the pump drive unit 8 via the drive shaft 105.

It will be appreciated by those skilled in the art that the pump assembly 1 eliminates sharp turns which would otherwise create substantial friction resulting in elevated head pressure in the floodwater 142 as the floodwater 142 flows through the pumping unit 34, the pump extension or extensions 2 and the drain conduit 112. For example, referring again to FIG. 7, the obtuse drain conduit inlet angle 73 which the main pump housing 64 facilitates between the pumping unit axis 136 of the pumping unit 34 and the drain conduit axis 137 of the drain conduit 112, as well as the obtuse ascending conduit angle 139 between the drain conduit ascending segment 114 and the drain conduit inlet segment 113 and the obtuse terminal segment angle 140 between the drain conduit terminal segment 115 and the drain conduit ascending segment 114 of the drain conduit 112, may facilitate a smooth pathway for the floodwater 142 in transit from the ditch 212 to the plain 215. The substantially reduced head pressure may dramatically reduce the energy required to operate the power unit 100 as well as lengthen the operational life of the pumping unit 34 and various other components of the pump assembly 1. Moreover, the pump assembly 1 is safe and quick to install, typically requiring about a day for installation as comparted to the weeks or months which may be required for pumps having the conventional design.

Figure 15:
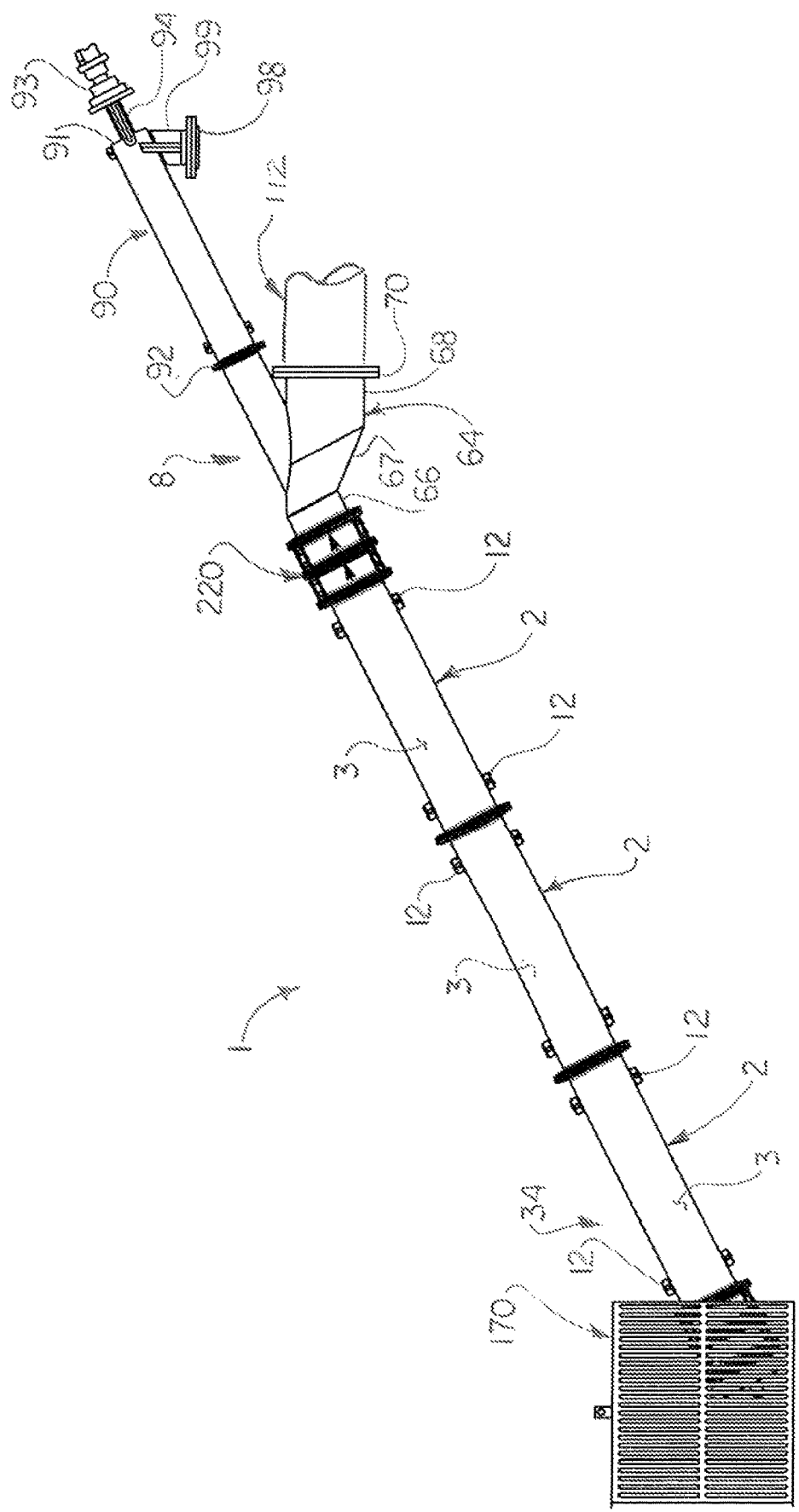
FIG. 15 is a side view of another illustrative embodiment of the pump assemblies, having a pipeline booster between the pumping unit of the pump assembly and the drain conduit.
Figure 16:
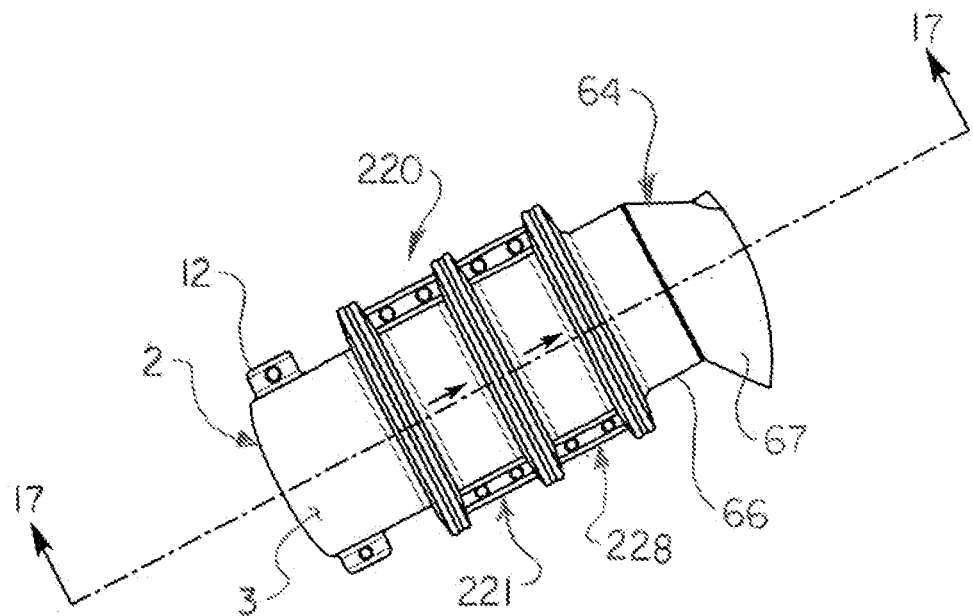
FIG. 16 is an enlarged side view of the pipeline booster illustrated in FIG. 15, coupled to a pump extension of the pump drive unit (illustrated in section) and the main pump housing (also illustrated in section)
Figure 17:
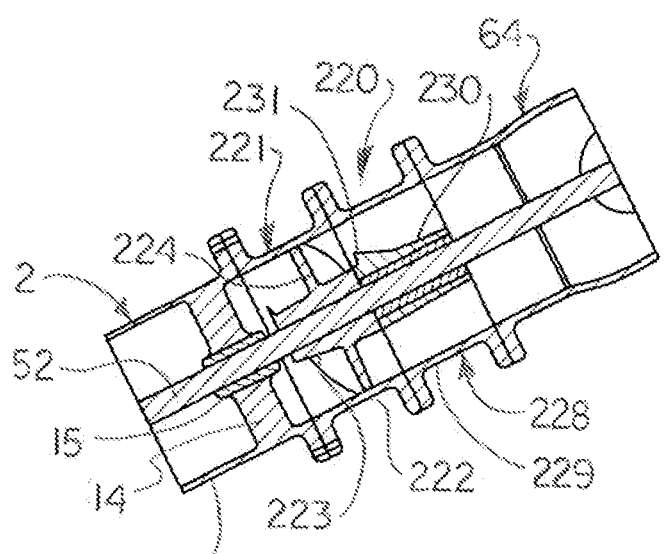
FIG. 17 is a longitudinal sectional view, taken along section lines 17-17 in FIG. 16, of the pipeline booster.

Referring next to FIGS. 15-17 of the drawings, in some embodiments of the pump assembly 1, at least one pipeline booster 220 may be provided between the pumping unit 34 and the drain conduit 112 of the pump assembly 1. The pipeline booster 220 may increase pressure of the floodwater 142 as the floodwater 142 is pumped from the pumping unit 34, through the main pump housing 64 and into and through the drain conduit 112, respectively. In some embodiments, the pipeline booster 220 may have a design which is the same as or similar to that of the pumping unit which is described in co-pending U.S. application Ser. No. 16/875, 190, filed May 15, 2020. As illustrated in FIGS. 16 and 17, in some embodiments, the pipeline booster 220 may include at least one booster impeller 221. The booster impeller 221 may include a booster impeller housing 222. The booster impeller housing 222 may be coupled to the pumping unit 34 via a flanged and bolted and/or other suitable connection. A booster impeller hub 223 may be drivingly engaged for rotation by the pump shaft 52 in the booster impeller housing 222. At least one booster impeller blade 224 may extend from the booster impeller hub 223.

The pipeline booster 220 may further include at least one booster diffuser 228. The booster diffuser 228 may be provided downstream of the booster impeller 221. The booster diffuser 228 may include a booster diffuser housing 229. The booster diffuser housing 229 may be coupled to the booster impeller housing 222 of the pipeline booster 220 and to the intake pumping segment 66 of the main pump housing 64 via a flanged and bolted and/or other suitable connection. A booster diffuser hub 230 may be drivingly engaged for rotation by the pump shaft 52 in the booster diffuser housing 229. At least one booster diffuser vane 231 may extend from the booster diffuser hub 230.

In typical operation of the pump unit 100, which may be as was heretofore described, the pump shaft 52 may pump the floodwater 142 from the ditch 212 (FIG. 8) through the cavitation cage 170, typically initially via the pumping unit impeller 36 and through the pumping unit diffuser 20 (FIG.

7) of the pumping unit 34. Due to the influence of gravity, however, imparted by the inclined trajectory of the slope 213 traversed by the pumping unit 34, the floodwater 142 may become sluggish or have a tendency to backflow through the pumping unit 34. Accordingly, the rotating booster impeller blades 224 of the booster impeller 221 may boost the downstream flow of the floodwater 142 against the pull of gravity to ensure that the floodwater 142 maintains a steady volume and rate of flow from the pumping unit 34 through the main pump housing 64 and into and through the drain conduit 112, respectively. The pipeline booster diffuser 228 may reduce the flow velocity of the floodwater 142, resulting in an increase in pressure in the floodwater 142 through the main pump housing 64 and the drain conduit 112, respectively.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A pump assembly suitable for a water pumping and distribution system, comprising:
   a pumping unit operable to pump water, the pumping unit having a longitudinal pumping unit axis;
   a pump drive unit comprising:
      a pump shaft housing;
      at least one shaft bearing in the pump shaft housing;
      a pump shaft engaging the at least one shaft bearing in the pump shaft housing, the pump shaft drivingly engaging the pumping unit; and
      a power unit drivingly engaging the pump shaft for rotation; and
   a drain conduit comprising:
      a drain conduit inlet segment disposed in fluid communication with the pumping unit and the pump shaft housing of the pump drive unit, the drain conduit inlet segment having a longitudinal drain conduit axis disposed at an obtuse drain conduit inlet angle to the longitudinal pumping unit axis of the pumping unit;
      a drain conduit ascending segment disposed in fluid communication with and ascending from the drain conduit inlet segment, the drain conduit ascending segment disposed at an obtuse ascending segment angle to the drain conduit inlet segment; and
      a drain conduit terminal segment disposed in fluid communication with the drain conduit ascending segment, the drain conduit terminal segment disposed at an obtuse terminal segment angle with respect to the drain conduit ascending segment, the drain conduit terminal segment disposed at a valve segment level above the at least one shaft bearing, whereby backflow water is capable of flowing through the drain conduit terminal segment, the drain conduit ascending segment and the drain conduit inlet segment, respectively, to flow into the pump shaft housing and contact the at least one shaft bearing.

2. The pump assembly of claim 1 wherein the pumping unit comprises a pumping unit housing having a pump intake end and a pump outlet end and at least one pumping unit impeller disposed in the pumping unit housing and drivingly engaged for rotation by the pump shaft.

3. The pump assembly of claim 2 further comprising at least one pumping unit diffuser having a plurality of diffuser veins in the pumping unit housing between the at least one pumping unit impeller and the pump outlet end.

4. The pump assembly of claim 2 further comprising a cavitation cage having a plurality of cage openings disposed in fluid communication with the pump intake end of the pumping unit housing.

5. The pump assembly of claim 1 further comprising at least one pump extension having a pump extension housing extending from the pump outlet end of the pumping unit housing, and wherein the pump shaft extends through the pump extension housing.

6. The pump assembly of claim 1 further comprising a main pump housing including:
   an intake pump housing segment disposed in fluid communication with the pumping unit housing of the pumping unit;
   a middle pump housing segment disposed in fluid communication with the intake pump housing segment, the middle pump housing segment disposed at an obtuse angle to the intake pump housing segment;
   an outlet pump housing segment disposed in fluid communication with the middle pump housing segment, the outlet pump housing segment disposed in substantially linear alignment with the middle pump housing segment;
   a main pump housing interior formed by the intake pump housing segment, the middle pump housing segment and the outlet pump housing segment;
   a shaft housing segment extending from the outlet pump housing segment and disposed in fluid communication with the main pump housing interior, the shaft housing segment disposed substantially in linear alignment with the intake pump housing segment; and
   wherein the drain conduit inlet segment of the drain conduit extends from the outlet pump housing segment and the pump shaft housing extends from the shaft housing segment of the main pump housing and the pump shaft extends through the shaft housing segment and the intake pump housing segment of the main pump housing.

7. The pump assembly of claim 1 further comprising a shaft input housing extending from the pump shaft housing, wherein the pump shaft extends through the shaft input housing, and an assembly support structure extending between the drain conduit inlet segment of the drain conduit and the shaft input housing.

8. The pump assembly of claim 1 further comprising at least one flow control valve in the drain conduit, the at least one flow control valve configured to facilitate unidirectional flow of floodwater through the drain conduit and having an upstream side and a downstream side, and further comprising a valve bypass assembly disposed in fluid communication with the drain conduit on the upstream side and the downstream side of the at least one flow control valve, the valve bypass assembly configured to facilitate bypass backflow of water with respect to the at least one flow control valve in the drain conduit.

9. The pump assembly of claim 1 further comprising at least one primary discharge conduit disposed in fluid communication and branching relationship with the discharge conduit terminal segment of the drain conduit.

10. The pump assembly of claim 9 further comprising at least one secondary discharge conduit disposed in fluid communication and branching relationship with the at least one primary discharge conduit.

11. The pump assembly of claim 1 further comprising a power unit stand detachably carried by the drain conduit, and wherein the power unit is carried by the power unit stand.

12. The pump assembly of claim 1 further comprising at least one pipeline booster having at least one booster impeller disposed between and in fluid communication with the pumping unit and the drain conduit.

13. A pump assembly suitable for a water pumping and distribution system, comprising:
- a pumping unit operable to pump water, the pumping unit having a longitudinal pumping unit axis;
- a pump drive unit comprising:
    - a pump shaft housing;
    - at least one shaft bearing in the pump shaft housing;
    - a pump shaft engaging the at least one shaft bearing in the pump shaft housing, the pump shaft drivingly engaging the pumping unit; and
    - a power unit drivingly engaging the pump shaft for rotation;
- a drain conduit comprising:
    - a drain conduit inlet segment disposed in fluid communication with the pumping unit and the pump shaft housing of the pump drive unit, the drain conduit inlet segment having a longitudinal drain conduit axis disposed at an obtuse drain conduit inlet angle to the longitudinal pumping unit axis of the pumping unit;
    - a drain conduit ascending segment disposed in fluid communication with and ascending from the drain conduit inlet segment, the drain conduit ascending segment disposed at an obtuse ascending segment angle to the drain conduit inlet segment; and
    - a drain conduit terminal segment disposed in fluid communication with the drain conduit ascending segment, the drain conduit terminal segment disposed at an obtuse terminal segment angle with respect to the drain conduit ascending segment, the drain conduit terminal segment disposed at a valve segment level above the at least one shaft bearing, whereby backflow water is capable of flowing through the drain conduit terminal segment, the drain conduit ascending segment and the drain conduit inlet segment, respectively, to flow into the pump shaft housing and lubricate the at least one shaft bearing;
- at least one flow control valve in the drain conduit, the at least one flow control valve configured to facilitate unidirectional flow of floodwater through the drain conduit from an upstream side to a downstream side of the at least one flow control valve; and
- a valve bypass assembly disposed in fluid communication with the drain conduit on the upstream side and the downstream side of the at least one flow control valve, the valve bypass assembly configured to facilitate bypass backflow of water with respect to the at least one flow control valve in the drain conduit, the valve bypass assembly comprising:
    - a bypass assembly inlet segment disposed in fluid communication with the drain conduit on the downstream side of the at least one flow control valve;
    - a valve bypass segment disposed in fluid communication with the bypass assembly inlet segment;
    - a bypass assembly outlet segment disposed in fluid communication with the valve bypass segment and the drain conduit on the upstream side of the at least one flow control valve; and
    - at least one air vent disposed in pneumatic communication with the valve bypass segment.

14. The pump assembly of claim 13 further comprising a plurality of primary discharge conduits disposed in fluid communication and branching relationship with the discharge conduit terminal segment of the discharge conduit and a plurality of secondary discharge conduits disposed in fluid communication and branching relationship with the plurality of primary discharge conduits.

15. The pump assembly of claim 13 further comprising a power unit stand detachably carried by the drain conduit, and wherein the power unit is carried by the power unit stand.

16. The pump assembly of claim 13 further comprising at least one pipeline booster having at least one booster impeller disposed between and in fluid communication with the pumping unit and the drain conduit inlet segment of the drain conduit and at least one booster diffuser disposed in fluid communication with the at least one booster impeller.

17. A water pumping and distribution system, comprising:
- a ditch;
- a slope extending upwardly from the ditch;
- elevated ground extending adjacent to and away from the slope;
- a plain spreading adjacent to and away from the elevated ground;
- at least one irrigation field on the plain; and
- a pump assembly comprising:
    - a pumping unit disposed along the slope in fluid communication with the ditch and operable to pump water from the ditch, the pumping unit having a longitudinal pumping unit axis;
    - a pump drive unit operably engaging the pumping unit, the pump drive unit comprising:
        - a pump shaft housing;
        - at least one shaft bearing in the pump shaft housing;
        - a pump shaft engaging the at least one shaft bearing in the pump shaft housing, the pump shaft drivingly engaging the pumping unit;
        - a power unit drivingly engaging the pump shaft for rotation; and
    - a drain conduit extending along the lev ted ground and comprising:
        - a drain conduit inlet segment disposed in fluid communication with the pumping unit and the pump shaft housing of the pump drive unit, the drain conduit inlet segment having a longitudinal drain conduit axis disposed at an obtuse drain conduit inlet angle to the longitudinal pumping unit axis of the pumping unit;
        - a drain conduit ascending segment disposed in fluid communication with and ascending from the drain conduit inlet segment, the drain conduit ascending segment disposed at an obtuse ascending segment angle to the drain conduit inlet segment;
        - a drain conduit terminal segment disposed in fluid communication with the drain conduit ascending segment and extending along the elevated ground, the drain conduit terminal segment disposed at an obtuse terminal segment angle with respect to the drain conduit ascending segment, the drain conduit terminal segment disposed at a valve segment level above the at least one shaft bearing, whereby back flow water is capable of flowing through the drain conduit terminal segment, the drain conduit ascending segment and the drain conduit inlet segment, respectively, to flow into the pump shaft housing and lubricate the at least one shaft bearing;

at least one primary discharge conduit disposed in fluid communication with the drain conduit terminal segment and extending along the plain; and at least one secondary discharge conduit disposed in fluid communication with the at least one primary discharge conduit and discharging at the at least one irrigation field.

18. The water pumping and distribution system of claim 17 further comprising at least one flow control valve in the drain conduit, the at least one flow control valve configured to facilitate unidirectional flow of floodwater through the drain conduit from an upstream side to a downstream side of the at least one flow control valve; and a valve bypass assembly disposed in fluid communication with the drain conduit on the upstream side and the downstream side of the at least one flow control valve, the valve bypass assembly configured to facilitate bypass backflow of water with respect to the at least one flow control valve in the drain conduit, the valve bypass assembly comprising:

a bypass assembly inlet segment disposed in fluid communication with the drain conduit on the downstream side of the at least one flow control valve;

a valve bypass segment disposed in fluid communication with the bypass assembly inlet segment;

a bypass assembly outlet segment disposed in fluid communication with the valve bypass segment and the drain conduit on the upstream side of the at least one flow control valve; and at least one air vent disposed in pneumatic communication with the valve bypass segment.

19. The water pumping and distribution system of claim 17 further comprising a power unit stand carried by the drain conduit and comprising a plurality of spaced-apart frame legs detachably attachable to the drain conduit and a main stand frame carried by the frame legs, and wherein the power unit is carried by the main stand frame of the power unit stand.

20. The water pumping and distribution system of claim 17 further comprising a cavitation cage having a plurality of cage openings disposed in the ditch and in fluid communication with the pump intake end of the pumping unit housing.

* * * * *